(12) United States Patent
Williamson et al.

(10) Patent No.: US 9,221,172 B2
(45) Date of Patent: Dec. 29, 2015

(54) CONSTRAINING ROBOTIC MANIPULATORS WITH REDUNDANT DEGREES OF FREEDOM

(71) Applicants: Matthew Murray Williamson, Marblehead, MA (US); Matthew DiCicco, Cambridge, MA (US); Joseph M. Romano, Somerville, MA (US)

(72) Inventors: Matthew Murray Williamson, Marblehead, MA (US); Matthew DiCicco, Cambridge, MA (US); Joseph M. Romano, Somerville, MA (US)

(73) Assignee: Rethink Robotics, Inc., Boston, MA (US)

( * ) Notice: Subject to any disclaimer, the term of this patent is extended or adjusted under 35 U.S.C. 154(b) by 108 days.

(21) Appl. No.: 14/029,343

(22) Filed: Sep. 17, 2013

(65) Prior Publication Data
US 2014/0081461 A1    Mar. 20, 2014

Related U.S. Application Data (60) Provisional application No. 61/701,900, filed on Sep. 17, 2012.

(51) Int. Cl.
| | | |
|---|---|---|
| *G05B 19/04* | (2006.01) | |
| *G05B 19/18* | (2006.01) | |
| *B25J 9/16* | (2006.01) | |
| *G05B 19/423* | (2006.01) | |

(52) U.S. Cl.
CPC ............ *B25J 9/1633* (2013.01); *B25J 9/1643* (2013.01); *G05B 19/423* (2013.01); *G05B 2219/36432* (2013.01); *G05B 2219/40365* (2013.01)

(58) Field of Classification Search
USPC .................................... 700/245–264
See application file for complete search history.

(56) References Cited

U.S. PATENT DOCUMENTS

| | | | |
|---|---|---|---|
| 5,130,632 | A | 7/1992 | Ezawa et al. |
| 5,193,963 | A | 3/1993 | McAffee et al. |
| 5,265,195 | A * | 11/1993 | Jinno et al. ................... 700/261 |
| 5,994,864 | A * | 11/1999 | Inoue et al. ................ 318/568.2 |
| 6,212,443 | B1 * | 4/2001 | Nagata et al. ................ 700/245 |
| 6,394,189 | B1 | 5/2002 | Moon et al. |
| 6,832,127 | B1 * | 12/2004 | Hao et al. ..................... 700/170 |
| 6,837,883 | B2 | 1/2005 | Moll et al. |
| 7,646,161 | B2 | 1/2010 | Albu-Schäffer et al. |
| 7,747,351 | B2 | 6/2010 | Tsusaka et al. |
| 8,069,747 | B2 | 12/2011 | Buckingham et al. |
| 8,160,743 | B2 | 4/2012 | Birkenbach et al. |
| 2002/0022907 | A1 * | 2/2002 | Takenaka et al. ............ 700/245 |

(Continued)

FOREIGN PATENT DOCUMENTS

WO    2014/043702 A1    3/2014

OTHER PUBLICATIONS

International Patent Application No. PCT/US2013/060165, International Search Report and Written Opinion mailed Feb. 13, 2014, 14 pages.

(Continued)

*Primary Examiner* — Bhavesh V Amin
(74) *Attorney, Agent, or Firm* — Morgan, Lewis & Bockius LLP (57) ABSTRACT

Redundant robotic manipulators may be constrained in their motions during operation in a gravity-compensated mode by applying, in addition to gravity-compensating torques, constraining torques to one or more of the joints. The constraining torques may urge the manipulator to a specified canonical posture, and may be modeled by virtual springs attached to the constrained joints.

10 Claims, 7 Drawing Sheets

(56) References Cited

U.S. PATENT DOCUMENTS

| | | | |
|---|---|---|---|
| 2002/0120363 | A1 | 8/2002 | Salisbury et al. |
| 2006/0178775 | A1* | 8/2006 | Zhang et al. ............... 700/245 |
| 2006/0206284 | A1* | 9/2006 | Hirabayashi ............... 702/141 |
| 2007/0066918 | A1 | 3/2007 | Dewald et al. |
| 2007/0142823 | A1* | 6/2007 | Prisco et al. ............... 606/1 |
| 2008/0179115 | A1* | 7/2008 | Ohm et al. ............... 180/9.21 |
| 2010/0243344 | A1 | 9/2010 | Wyrobek et al. |
| 2011/0118872 | A1 | 5/2011 | Ortmaier et al. |
| 2011/0184558 | A1 | 7/2011 | Jacob et al. |
| 2012/0310412 | A1* | 12/2012 | Seo et al. ............... 700/254 |

OTHER PUBLICATIONS

Albu-Schäffer et al., "Cartesian Impedance Control Techniques for Torque Controlled Light-Weight Robots", Proceedings of IEEE International Conference on Robotics and Automation, ICRA '02, vol. 1, 2002, pp. 657-663.

Arimoto et al., "Human-Like Movements of Robotic Arms with Redundant DOFs: Virtual Spring-Damper Hypothesis to Tackle the Bernstein Problem", Proceedings of IEEE International Conference on Robotics and Automation, ICRA 2006, May 15-19, 2006, pp. 1860-1866.

Baejihun "Kitech 8 DOF Robotic Arm", Robotic Arm Developed in NRHP (National Robot Hardware Platform), Uploaded on Nov. 29, 2010, available online at <http://www.youtube.com/watch?v=m3YyPFSaFp0>.

Balaguer et al., "Sultan: Simultaneous User Learning and Task Execution, and its Application in Assistive Robotics", New and Emerging Technologies in Assistive Robotics, IROS 2011, Sep. 26, 2011, 3 pages.

Brock et al., "Elastic Strips: A Framework for Motion Generation in Human Environments", The International Journal of Robotics Research, vol. 21, No. 12, Dec. 1, 2002, pp. 1031-1052.

Brock et al., "Real-Time Replanning in High-Dimensional Configuration Spaces Using Sets of Homotopic Paths", Proceedings of IEEE International Conference on Robotics and Automation, ICRA '00, vol. 1, 2000, pp. 550-555.

\* cited by examiner

CONSTRAINING ROBOTIC MANIPULATORS WITH REDUNDANT DEGREES OF FREEDOM

CROSS-REFERENCE TO RELATED APPLICATION

This application claims priority to and the benefit of, and incorporates herein by reference in its entirety, U.S. Provisional Application No. 61/701,900, filed on Sep. 17, 2012.

TECHNICAL FIELD

The present invention relates to systems and methods for constraining the motion of robotic manipulators with redundant degrees of freedom and, in particular, to approaches consistent with guiding such redundant manipulators by their end-effectors.

BACKGROUND

Industrial robots perform a variety of tasks involving the movement and manipulation of physical objects. A typical industrial robot may, for example, have one or more arms (or, more generally, appendages), equipped with grippers or other end-effectors, that allow the robot to pick up objects at a particular location, transport them to a destination location, and put them down in accordance with particular coordinates. Controllers for existing industrial robots are typically programmed in languages that specify exact positions and trajectories for the robot arm(s). During execution of a programmed task, the robot arm moves a reference coordinate associated with its most distal link to an exactly specified new position, following an exactly specified trajectory. Recent programming systems for industrial robots have input layers that allow a user to teach the robot locations and trajectories by simply grabbing the robot's end-effector and guiding it to the relevant location within the robot's workspace. This method is intuitive to the user, and because the robot can sense its own state (joint angles, forces etc.), it allows complex tasks or motions to be easily demonstrated, sensed, and recorded.

To facilitate hand-guiding of a robot arm, typically, one of two general approaches is employed: In the first approach, the robot is configured to "admit" user-directed motion by sensing forces or torques at the endpoint of the arm and controlling the robot's motions to minimize these forces. For this purpose, "admittance devices" require highly accurate force-sensing capabilities, which may be provided, e.g., by force/torque load cells mounted to the end-effectors, as well as an accurate dynamic model and control scheme for the robot platform. Load cells are fragile, however, making them impractical for robots that experience heavy usage. Furthermore, for mass-produced robots, both the load cells and the hardware required to implement an accurate dynamic model and control scheme are expensive—often prohibitively so.

In the second approach, the robot is designed to only minimally "impede" the motion desired by the user. Low mechanical impedance can, in principle, be achieved by reducing the mass and inertia of the robot's moving components, but this is impractical for robots intended to carry significant loads, which are preferably themselves large and heavy. Alternatively, low-impedance devices may actively apply forces and torques to the joints so as to allow the user to freely control the position of the arm. For example, the robot may be operated in a mode in which the forces applied internally at the joints accurately compensate for the gravitational forces due to the masses of the links constituting the robot's arm. If, at each joint, the internally applied torque balances against the weight of the downstream links, then the arm will float and be easy to move—to the user, it will feel as if the arm were in reduced or zero gravity. Any slight errors in the compensation will generally cause the arm to float or drift in space, but if a human is holding the arm, this drift can be easily overcome.

For robot arms with six or fewer degrees of motion, the position and orientation of the most distal link (which can be represented as a six-dimensional vector specifying, e.g., the spatial coordinates x, y, and z, as well as—in Euler notation—the roll, pitch, and yaw of the distal link) uniquely determine the settings for all the joints of the robot. If the robot arm has more than six degrees of freedom, however, many different configurations of the links and joints result in the same endpoint, and further specification of the desired pose of the arm is required to remove any ambiguity. Such "redundancy," as it is commonly called, is often desirable as it provides greater dexterity for the robot. For a redundant robot (i.e., a robot with more degrees of freedom than are uniquely specifiable via the position and orientation of the endpoint), the preferred posture may be chosen based on the task so as to, e.g., avoid obstacles, reduce joint torques, minimize movements, etc. Robots that do not have redundant degrees of freedom, by contrast, do not provide flexibility to take such additional criteria into consideration, once the endpoint is specified. The term "posture" is herein used to connote a position and orientation of the arm or other manipulator, or a plurality of elements thereof. The posture may be specified in any convenient reference frame; for example, posture may be specified by a set of values for coordinates corresponding to degrees of freedom of the manipulator that collectively specify spatial positions and orientations of at least some elements thereof, or by a set of values for coordinates corresponding directly to three-dimensional spatial positions and orientations (e.g., relative to the robot or relative to the room in which the robot operates).

On the downside, redundancy implies that the user cannot completely control the posture of the arm (at least not with one hand) because the position of the endpoint does not fully constrain the motion of the other parts. For example, for a robot arm with similar kinematics to a human arm, it is not possible to force motion of the elbow by moving the end-effector (or "hand" of the robot). While the user can force the robot arm's posture using both of her hands (e.g., by moving the hand and elbow simultaneously), it is, generally, preferable for the user to be able to guide the arm with a single hand to free up her other hand for, e.g., pressing a button, working a separate interface, etc. For low-impedance redundant manipulators, a further (perhaps more important) problem is that any errors in the forces and/or torques applied at the joints will cause the redundant parts of the arm to drift uncontrollably, which is both impractical and potentially dangerous (e.g., if it results in collisions of the arm with other parts of the robot or with people and objects in the robot's environment).

Accordingly, to be effective as a solution to hand-guiding a redundant robot manipulator from the end-effector, the manipulator needs to be easy to move, constrained in a manner that eliminates or at least reduces uncontrollable drifts, and preferably reconfigurable in its posture when needed.

SUMMARY

The present invention provides systems and methods for constraining the posture and/or movement of a redundant robotic manipulator such that the manipulator can easily be guided from its endpoint using a single hand, but does not move uncontrollably when operated in gravity-compensated mode. In accordance with various embodiments, the redundant degrees of freedom of a low-impedance robot are weakly constrained—i.e., rather than reducing the degrees of freedom of the robot arm, constraining forces and/or torques are internally applied at the robot joints to urge the robot arm towards a particular preferred configuration, hereinafter a "canonical posture." By virtue of these constraining forces and/or torques, the robot arm moves within the space spanned by its motional degrees of freedom (i.e., the space of its possible postures) as if within an energy potential having a minimum at the canonical posture.

The constraining forces or torques are generally determined based on a computational model of the robot manipulator, and are added to the torques and forces that compensate for gravity. For example, the constraining forces or torques may be modeled as (restoring) forces exerted by "virtual springs" (i.e., springs that are used for computational purposes only and generally do not correspond to any physical component of the manipulator). In some embodiments, the virtual springs are torsional springs connected to one or more strategically selected joints, which pull the joints back towards their respective canonical rotational positions (i.e., the rotational positions that the joints assume in the canonical configuration) with respective restoring forces that depend in magnitude on the rotational displacement of the joints from their canonical positions. In other embodiments, constraints are imposed in Cartesian (i.e., xyz) space rather than "joint space," i.e., a canonical position is defined in terms of the Cartesian spatial coordinates of one or more strategically selected points of the robot arm rather than in terms of the angles (i.e., rotational positions) of selected joints. For example, the "elbow" of the robot may be constrained to a particular ("canonical") height. Cartesian constraints can be implemented by modeling virtual springs attached between the selected points on the arm and fixed locations in three-dimensional space; the springs exert restoring forces that depend on the (linear) displacement of the strategic points from the respective fixed locations. To select joints and/or points on the robot arm "strategically" means herein that the constraints imposed on the selected joints or points have a significant impact on the robot arm motions, i.e., work particularly well to constrain redundancies, compared with constraints imposed on other joints or robot points.

The constraining forces and torques applied at the joints generally propagate through the arm to exert forces at the end-effector, which may be counter-acted by the user if he holds the end-effector still. In some embodiments, however, constraining forces and/or torques are applied from the outset in the robot's "null space," herein defined as the space in which the robot links can move without moving the endpoint; the null space generally depends on the instantaneous position and orientation of the endpoint, and within the null space, forces on the end-effector are avoided. The computation of the forces and/or torques may, in this case, involve the projection of the canonical posture and the current posture into the (instantaneous) null space.

In some embodiments, the canonical posture can be set physically by the user. For example, the user may put the robot arm in a desired posture and then press a switch to initialize the canonical posture to the current posture. In other embodiments, the canonical posture is set numerically (e.g., programmatically or by user specification of angular positions of the joints or other posture parameters via a traditional user interface). The canonical posture need not be a single, fixed posture, but may vary dynamically as a function of, for example, the robot's location and orientation in the workspace or relative locations and orientations of robot parts (e.g., the location of the endpoint or the orientation of the robot's shoulders relative to the robot's body). For example, the canonical posture when the robot arm is at the front may be to point the elbow backward and to the side, whereas the canonical posture when the robot arm is at the back would be to keep the elbow forward and to the side. At any instant in time, however, the canonical posture is fixed.

In one aspect, the invention pertains to a method of constraining a redundant robotic manipulator that includes a plurality of joints and operates in a mode that compensates for gravity. The method involves computing (using a processor) one or more constraining torques for urging a posture of the manipulator toward a canonical posture. The constraining torque(s) depend(s) on a displacement of the posture of the manipulator from the canonical posture. The method further involves applying total torques comprising gravity-compensating torques and the computed constraining torque(s) to the joints, whereby the redundant manipulator is operated so as to compensate for gravity while movements of the redundant manipulator are constrained.

The constraining torque(s) may include a restoring torque whose magnitude depends linearly on the displacement. In some embodiments, a constraining torque is computed as a torque applied by a virtual spring attached to one of the joints and pulling that joint toward a canonical position thereof. In some embodiments, a constraining torque is computed as a torque resulting from a restoring force applied by a virtual spring attached to a selected point of the manipulator and pulling that point into a selected Cartesian direction toward a canonical Cartesian position; the constraining torques may be non-zero only for joints proximal to (i.e., upstream of) the selected point. Alternatively, the constraining torque may be computed as a torque applied by a spring attached, at one end, to at least one of a joint or a selected point of the manipulator and, at a second end, to a mass with static friction. The magnitude of the constraining torque(s) may be set so as to minimize an internal force at an endpoint of the manipulator. The constraining torque(s) may be computed in a null space of the manipulator.

The method may further include setting the canonical posture to a current posture of the manipulator in response to user input. Further, the canonical posture may be defined as a function of at least one of a location or orientation of a part of the robotic manipulator relative to other robot parts, a robot location or orientation within or a condition associated with a robot workspace, or a currently executed robot task. The canonical posture may be specified by a set of values for coordinates corresponding to degrees of freedom of the manipulator that collectively specify spatial positions and orientations of at least some elements thereof.

In another aspect, the invention is directed to a robot including a manipulator comprising a plurality of links connected in series by a plurality of joints, controllers associated with the joints for applying torques thereto, and a computational facility in communication with the controllers for computing torques to be applied to the joints in a mode compensating for gravity. The manipulator has at least one redundant degree of freedom, and the torques include a constraining torque urging the posture of the manipulator to a canonical posture. The constraining torque may include a restoring torque whose magnitude depends linearly on the displacement. The computational facility may include a module for computing the constraining torque(s) in a null space of the manipulator, or a module for setting the magnitude(s) of the constraining torque(s) to minimize an internal force at an endpoint of the manipulator.

The computational facility may further include memory storing a computational representation of the canonical posture. The stored canonical posture may be defined as a function of the location and/or orientation of a part of the robotic manipulator relative to other robot parts, a robot location or orientation within or a condition associated with a robot workspace, or a currently executed robot task. The robot may further include sensors for measuring parameters of the posture of the manipulator, and the computational facility may include a module for computing, based on the measured parameters, a displacement of the posture of the manipulator from the canonical posture. The robot may further include a user-interface element allowing a user to set the canonical posture to a current posture of the manipulator. The robot's joints may include series elastic actuators, and the computational facility may be configured to cause the controllers associated with the joints to drive the actuators with respective drive currents corresponding to the torques to be applied to the joints.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1A:
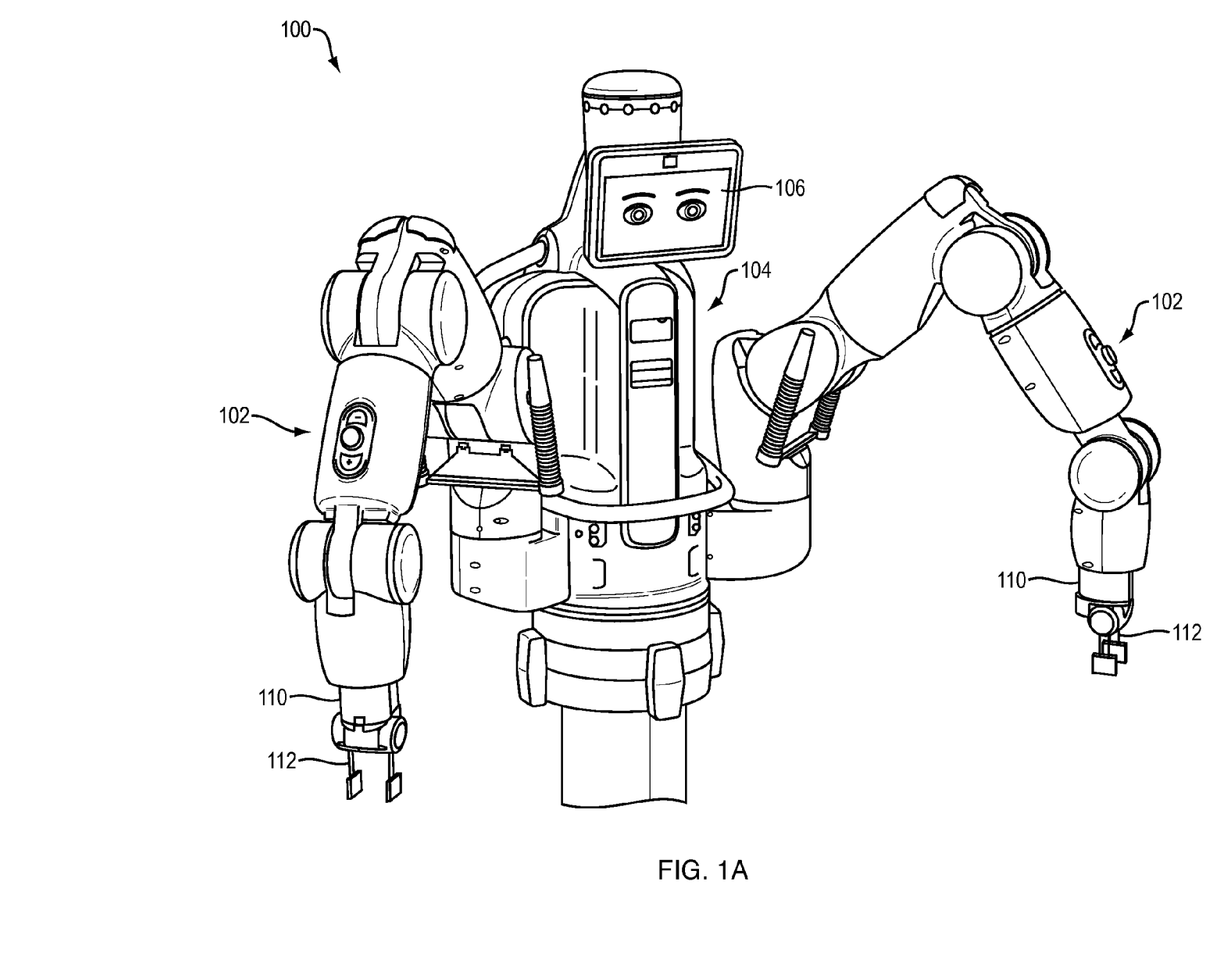
FIG. 1A is a perspective view illustrating an exemplary robot in accordance with various embodiments.
Figure 1B:
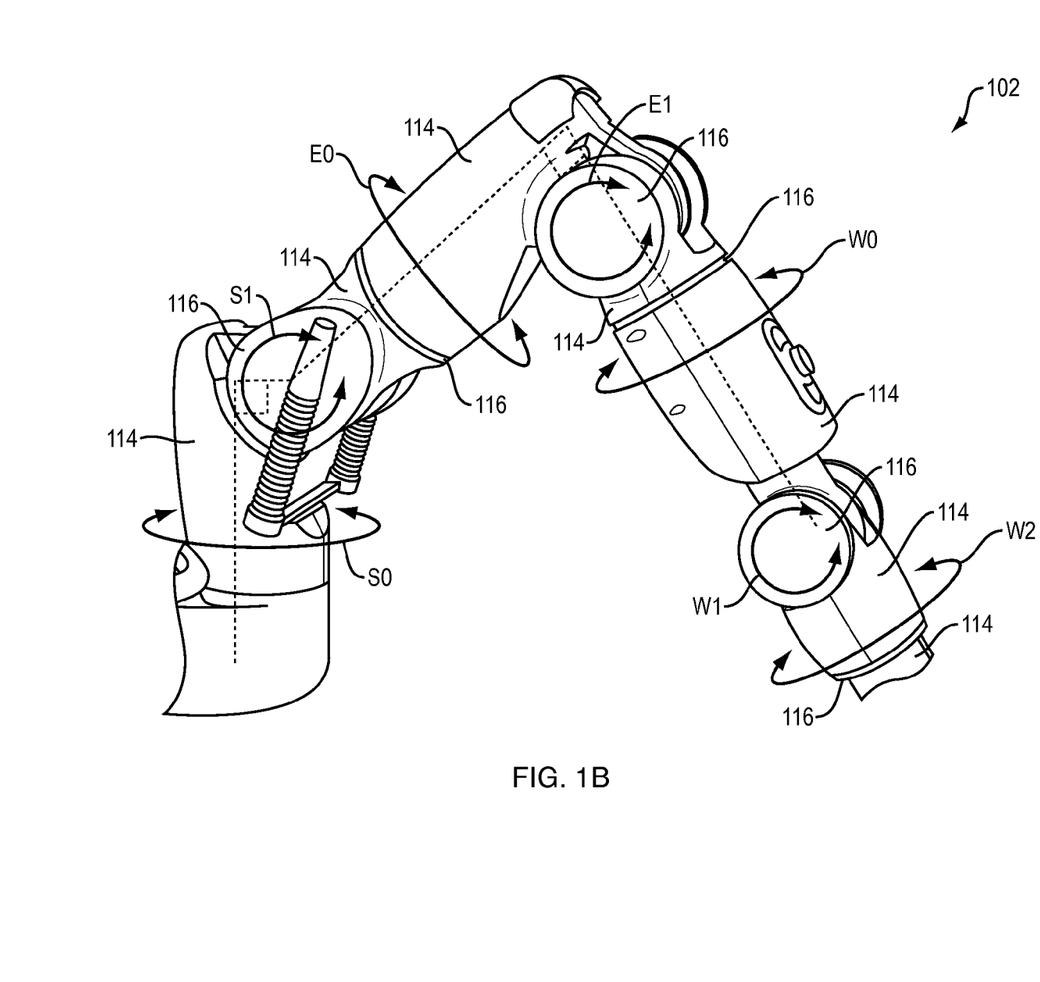
FIG. 1B is a close-up view of a robotic manipulator (i.e., arm) of the robot of FIG. 1A in accordance with various embodiments.

FIG. 1A illustrates an exemplary, humanoid robot in accordance herewith. The robot 100 includes two robotic manipulators 102, or "robot arms," connected to a robot body 104, as well as a user interface including a screen 106 and various mechanical controls (such as buttons and touch pads) that facilitate user input. Each arm 102 has a wrist 110 with a parallel-jaw gripper 112 mounted thereto as an end-effector. FIG. 1B provides a close-up view of a robot arm 102. The arm 102 includes seven links 114 connected in series by seven one-dimensional rotary joints 116 that collectively provide seven degrees of freedom—i.e., one redundant degree of freedom. As indicated by the arrows in FIG. 1B, each joint 116 either serves as a hinge that allows an angle to vary between two links 114 (i.e., allows the links to rotate around an axis through the joint that is perpendicular to the axes of the links), or facilitates rotation of the more distal link 114 around its central axis (i.e., an axis connecting the joints on either end of that link). Of course, the robot 100 depicted is only one particular example; in general, robots in accordance herewith may include, e.g., fewer or more than two manipulators, different numbers of links and joints in a manipulator, different types of joints (e.g., slip joints, universal joints, etc.), different types of end-effectors (e.g., suction grippers), an overall different configuration of the various robot parts (such as the body and arms), etc. A larger number of links and joints and/or joints that provide more than one degree of freedom (e.g., universal joints) generally increase the number of degrees of freedom and, thus, the amount of redundancy in the robot manipulators.

The robot 100 typically operates in force-control mode, where actuators apply specified forces to the joints in accordance with commands received from joint-level controllers. The joint-level controllers, in turn, may receive commands from a higher-level robot controller that monitors and alters robot positions, kinematics, dynamics, and forces. The robot controller may be part of or in communication with a computational facility (described in detail below with reference to FIG. 5), which computes the forces and torques required for the performance of the robot's tasks or, in a user-guided and gravity-compensated mode of operation, the forces and torques necessary to compensate for the gravity of the robot arm links while imposing constraints on robot arm motions to stabilize the redundant system in accordance herewith. The computation generally utilizes a three-dimensional self-model of the robot, i.e., a data structure representing the geometries, masses, and structural relationships between the robot parts as well as the robot's current configuration (including parameters indicative of the positions and orientations of the links of the arms), which may be based on sensor measurements.

Figure 2:
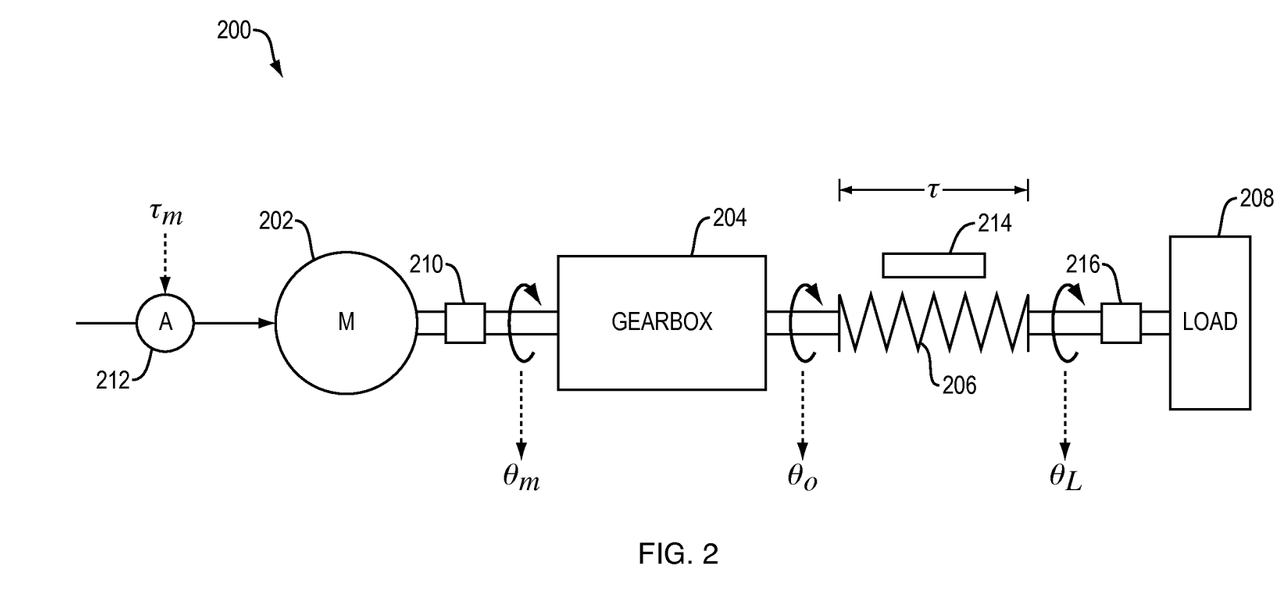
FIG. 2 is a schematic drawing of a series elastic actuator that may be employed at the robot joints in accordance with various embodiments.

In some embodiments, series elastic actuators are used at the robot joints. Series elastic actuators are described in detail in, for example, U.S. Pat. No. 5,650,704, issued on Jul. 22, 1997, the entire disclosure of which is hereby incorporated herein by reference. As schematically illustrated in FIG. 2, a series elastic actuator 200 for a joint generally includes a motor 202, a gearbox 204, and a series elastic element 206 through which the load 208 is transmitted, such as a spring (e.g., a torsional spring in case of a rotary joint) connected in series between the gearbox 204 and load 208. The load 208 at a particular joint 114 includes all robot components (e.g., manipulator links 114, other joints 114, etc.) distal to that joint as well as, during performance of the robot's regular tasks, any object the robot carries with the respective arm 102—in other words, everything that contributes to the external torque applied to the joint 114. To support the load 208, the motor 202 is driven by an adequate electrical current, as computed by the computational facility. The series elastic actuator 200 is typically equipped with one or more sensors for monitoring the state of the joint, such a position sensor or encoder 210 (e.g., a set of Hall-effect sensors and associated counting circuitry) associated with the motor 202, an Ampere-meter 212 measuring a current supplied to the motor 202, a spring deflection sensor 214 measuring the angle that the series-elastic element 206 deflects, and an output position sensor 216 (e.g., a magnetic angle encoder) measuring the output angle of the joint. The electrical current driving the motor 202 may be set by the respective joint-level controller, taking into account measurements of the angular motor position, the spring torque, and the output angle (i.e., the angular position of the load). The sensor measurements may be monitored for mutual consistency (e.g., based on a model of joint operation) to ensure that the robot 100 operates as intended.

In various embodiments, the robot 100 provides a training mode, or user-guidance mode, in which the robot's arms 102, rather than moving automatically (e.g., in accordance with a programmed task), move passively in response to a user's physical hand-guiding. Typically, the user guides the arm 102 by its wrist 110 or end-effector, but physical user manipulation of the other robot joints and links is also possible. To maximize the user's ease in guiding the arm 102, the robot may be operated in zero-force gravity-compensated mode. Conventionally, this mode is implemented by commanding the torque at each joint of the robot to be equal to the torque that would be required to balance the downstream masses from that joint. For example, the torque at joint j, $T_j$, is given as a function of the current joint angles $\{\theta_i\}$ of the various joints i of the robot, and the masses $\{m_k\}$, lengths $\{l_k\}$, and distances from the joints to the centers $\{d_k\}$ of all the links k within a robot arm (which constitute parameters of the self-model):

$$T_j = G_j(\{\theta_i\}, \{m_k\}, \{l_k\}, \{d_k\})$$

The function $G_j$ for each joint can be readily calculated analytically, or using, for example, open-source robot control software such as the Kinematics and Dynamics Library (KDL) provided by the Orocos Project and downloadable at http://orocos.org/wiki/orocos/kdl-wiki.

Figure 3A:
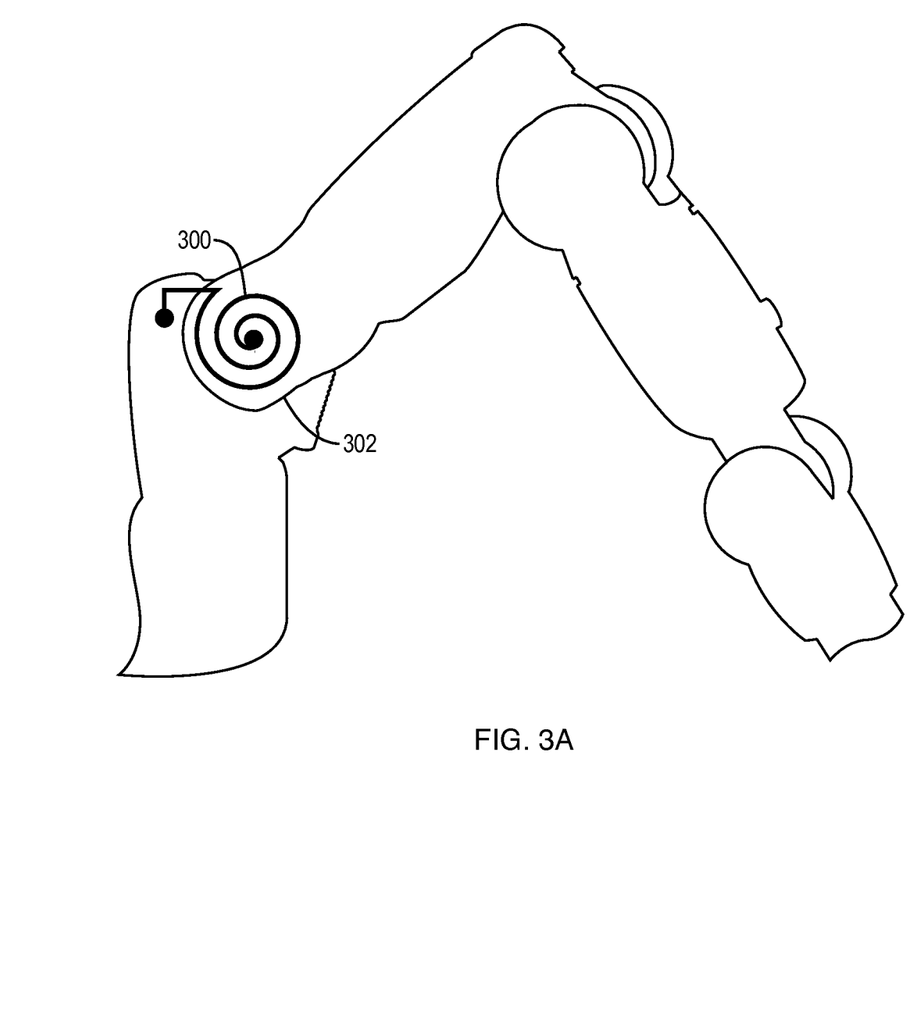
FIG. 3A is a schematic drawing illustrating virtual springs applied at multiple joints of a robot arm in accordance with one embodiment for computing constraining forces or torques.

To impose (weak) constraints on the motion of the robot arm, the conventional zero-force gravity-compensated mode may be modified by adding terms to the computation of the torques; these additional torque terms are set such that the robot arm tends to move towards a pre-determined canonical configuration or posture. In some embodiments, the canonical posture is defined in terms of canonical rotational or center rotational positions $\theta_{j0}$ of (at least some of) the robot joints. To compute a torque that pulls a joint back towards its canonical rotational position, the joint may be modeled as attached to a virtual torsional spring connected to a fixed point corresponding to the canonical position, or, more intuitively, as including a virtual torsional spring, connected between the two links on either side of the joint, whose relaxed (i.e., equilibrium) state corresponds to the canonical rotational position $\theta_{j0}$. FIG. 3A conceptually illustrates such a virtual spring 300 connected, by way of example, between two adjacent links at a joint 302. (The spring 300 is "virtual" in the sense that it does not correspond to an actual physical element of the robot arm. Note, however, that the joint 302 may, and typically does, include a real, physical spring, such as the spring 206 of a series-elastic actuator, which measures the total torque at the joint.) The virtual spring exerts a restoring torque on the joint that depends on the angular displacement of the joint j from the canonical position $\theta_{j0}$. The torque exerted by the virtual spring may, optionally, also include a damping term that depends on (and opposes) the angular velocity $d\theta_j/dt$ of the joint. Thus modified, the torque $T_j$ internally applied at joint j takes the following form:

$$T_j = G_j(\{\theta_i\}, \{m_k\}, \{l_k\}, \{d_k\}) + \alpha_j \cdot [K_j(\theta_j - \theta_{j0}) + D_j(d\theta_j/dt)]$$

Herein, $\alpha$ is a scaling term extracted from the restoring term K and the damping term D for clarity, whose range may be set, e.g., such that $\alpha=100$ corresponds to maximum stiffness and $\alpha=0$ to (exact) zero-gravity mode.

Alternatively to computing the constraining torques based on a pure spring model, a simple friction model may be implemented by modeling the joint as attached to a torsional spring connected to a mass with static friction rather than to a fixed point corresponding to a constant canonical position. In this case, when $\alpha \cdot [K(\theta_j - \theta_{j0})]$ exceeds a specified threshold, the desired position $\theta_{j0}$ is updated to be $$\theta_{j0}(t+1) = \theta_{j0}(t) + (1/m_j) \cdot \alpha_j \cdot [K_j(\theta_j - \theta_{j0}(t))],$$

where $m_j$ is a joint-specific scaling factor. To refine the friction model, a velocity term may be added:

$$\theta_{j0}(t+1) = \theta_{j0}(t) + \beta \cdot d\theta_j(t)/dt \cdot dt,$$

where $\beta$ is a scaling parameter set to less than 1.

Whereas the virtual-spring models discussed above relate specifically to torsional springs for constraining rotational degrees of freedom, this approach can straightforwardly be extended to encompass also linear virtual springs applied to joints that allow for relative linear motion between adjacent links, such as slip joints. Further, multiple virtual springs may be applied to the same joint if that joint provides more than one degree of freedom.

Virtual springs may generally be applied to (i.e., suitable restoring-force and/or damping terms may be added to the internally applied torques computed for) one, some, or all of the joints. In typical embodiments, however, virtual springs are strategically added only to those joints that contribute appreciably to the redundancy of robot-arm motion, whereas joints that are controlled (completely or to a large extent) by the user when guiding the arm are operated in true zero-gravity mode. (Note that the number of joints contributing to the redundancy is not necessarily equal to the number of redundant degrees of freedom.) For example, with reference to FIG. 1B, if the arm is held at the end-effector, then the lower parts of the arm and wrist (corresponding to E1, W0, W1, W2 in FIG. 1B), as well as the base shoulder twist (S0) can be easily controlled by the user and need not be computationally constrained. The redundant part of the mechanism is the "elbow", which can be constrained by adding virtual springs to the two elbow joints, S1 and E0. However, in principle, virtual springs can be added to all joints, generally with different values of $\alpha$ for each joint to set the stiffness of each spring independently.

The stiffness, as captured collectively by the parameter values of $\alpha$, K, and D, may be tuned so that the arm is easy to move, but the redundancy is sufficiently constrained. This generally involves a trade-off: if $\alpha$ is set too low, the arm will be easier to move, but the elbow 110 will be less constrained, and vice versa. The optimal level of stiffness may depend on the particular application. In general, the stiffness is chosen such that a user of average strength and height, when in an ordinary and suitable posture for guiding the arm, can move the robot arm by hand without exerting undue force. In some embodiments, the optimal stiffness is determined empirically. For instance, each of multiple test users may be asked to guide the arm under various settings of the stiffness value (or sets of stiffness values if multiple joints are involved) and select the setting that is most comfortable to her (or rate or rank the settings based on relative comfort levels); a user's comfort level may take into account both the ease with which the robot arm can be guided and the stability of the arm's motion (which depends on the strength of the imposed constraints). The different test users' responses may then be averaged or otherwise combined to optimize the settings for the group.

When constraining torques that urge each constrained joint toward its canonical position are applied directly to the joints, a net torque or force f generally results at the endpoint of the robotic manipulator. To keep the endpoint still or move it at will (other than toward the canonical configuration), the user needs to counter-act this net torque or force f at least partially. The relative settings of the stiffnesses $\alpha$ for various joints may be exploited to reduce the net torque or force f. Specifically, one way of setting a is to minimize the force f felt by the user when the arm is held still, which is given as:

$$f = J^+(T - G_{real}(\{\theta_i\}, \{l_k\}, \{d_k\})),$$

where $J^+$ is the Jacobian pseudo-inverse, which is a function of the vectors T and $G_{real}$ representing the torques applied to the joints internally by the robot and externally by gravity, respectively. In the case of the spring model discussed above, assuming that the gravity-compensating forces G equal the actual gravitational forces $G_{real}$, this equals:

$$f = J^+ (\alpha \cdot [K(\{\theta_j - \theta_{j0}\}) + D(\{d\theta_j/dt\})]).$$

As the user moves the arm holding the endpoint, she will feel, in addition to any remaining force term f (which is due to the virtual springs added to the joints), forces due to the inertia of the arm.

In some embodiments, virtual-spring-induced forces at the endpoint are avoided entirely or almost entirely (i.e., within the limits of computational accuracy and precision) by confining these internally applied forces to the robot's null space, i.e., the range of motions of the robotic manipulator that do not move the endpoint. The null space is a sub-space of the space spanned by the manipulator's degrees of freedom, and its dimensionality equals the number of redundant degrees of freedom of the manipulator. The dimensions of the null space are not generally individually associated with specific joints, but are associated collectively will all joints contributing to the redundancy, and may correspond to relationships between the positions of these joints. For example, a manipulator with one redundant degree of freedom may have two one-dimensional joints contributing to the redundancy, resulting in a one-dimensional null space that lies in the two-dimensional space spanned by the redundant degrees of freedom and relates the position of one redundant joint to the position of the other.

To apply forces or torques in the null space, the displacement of the joints from the canonical positions, which may be expressed as vectors in the space spanned by the manipulator's degrees of freedom (e.g., a vector with magnitude $(\theta_j - \theta_{j0})$ (the rotational angle) in the direction of the degree of freedom associated with joint j), may be projected into the null space, i.e., the component of the displacement vector parallel to the null space may be extracted (and the perpendicular component disregarded). The projected vectors may be expressed as:

$$(I - J^+ J)(\theta - \theta_0),$$

where I is the identity matrix, J is the Jacobian, and $\theta$ and $\theta_0$ are the vectors of the current angular positions and the canonical positions, respectively. Virtual springs may then be applied in the null space to generate forces parallel to the projected displacement. (Note that this involves, generally, not merely a projection of the current posture, but also of the canonical posture, into the null space, as the instantaneous null space may differ from the null space that existed at the time the canonical posture was set because the endpoint may have moved since.) The resulting torque may be expressed, e.g., as:

$$T = K(I - J^+ J)(\theta - \theta_0),$$

where K is a gain converting displacement to torque. These virtual springs drive the joints towards the canonical posture without causing extra forces at the endpoint. (In general, the canonical posture can vary over time and, thus, be different the posture that existed at the time the canonical posture was set, as the endpoint may have moved.) The projection needs to be continuously recalculated as the endpoint moves (even if the canonical pose remains the same). Alternatively, the forces or torques may be computed initially without regard to the null space (e.g., resulting in a torque $K(\theta - \theta_0)$, and thereafter projected into the null space, resulting in $T = (I - J^+ J) K(\theta - \theta_0)$ (which is identical to the above, as K is a scalar). Either way, the final torques applied to the joints j by the robot can be expressed as:

$$T_j = G(\{\theta_i\}, \{m_k\}, \{l_k\}, \{d_k\}) + P(\theta_j, \theta_{j0}),$$

where $\theta_{j0}$ is a desired (i.e., canonical) angular position of the joint j, and P is a projection function that depends on the angular displacement and projects the angles and/or forces into the null space:

$$P(\theta_j, \theta_{j0}) = K(I - J^+ J)(\theta - \theta_0).$$

The canonical positions $\theta_{j0}$ for the joints that are constrained by virtual springs can be set in a variety of ways. In one embodiment, the user can simply set the canonical positions to the current positions of the joints by pressing a designated switch, which may be located, e.g., at the distal end of the arm so as to be reachable easily while the user holds the end-effector. When the user presses the switch, the arm goes into zero-force gravity-compensated mode, allowing the user to guide the arm into the desired posture (by moving the robot's end-effector with one hand, and optionally pushing the elbow with another hand), and then initialize the canonical posture to that posture by releasing the switch, which turns on the "stiff mode," i.e., the modified zero-force gravity-compensated mode described above (with $\alpha > 0$). This mechanism affords the user easy control over the canonical posture: to reset the canonical posture at any time, she merely needs to press the button, move the arm to the new posture, and release the button. Alternatively, the canonical angular positions may be entered numerically via a keyboard or other user interface device (e.g., a mechanical dial or a graphic user-interface element). The robot may also be programmed with a default canonical posture.

In some embodiments, the canonical posture is defined, and constraints are imposed, in Cartesian (i.e., xyz) space instead of joint space. In this approach, rather than selecting strategic joints to limit the arm's motion, a strategic point on the arm and an associated direction are chosen to constrain the arm. For example, the elbow height of the robot (i.e., the position of the elbow in the z-direction) may be confined to a specified height, a range about a specified height, or even the space above or below a specified height. The particular point on the robot and direction can generally be chosen based on knowledge of the robot arm's degrees of freedom and the part at which the arm will be held by the user. Of course, a particular point may also be constrained in more than one dimension (although, if three spatial coordinates for a robot point are specified, the constraint is no longer weak).

Figure 3B:
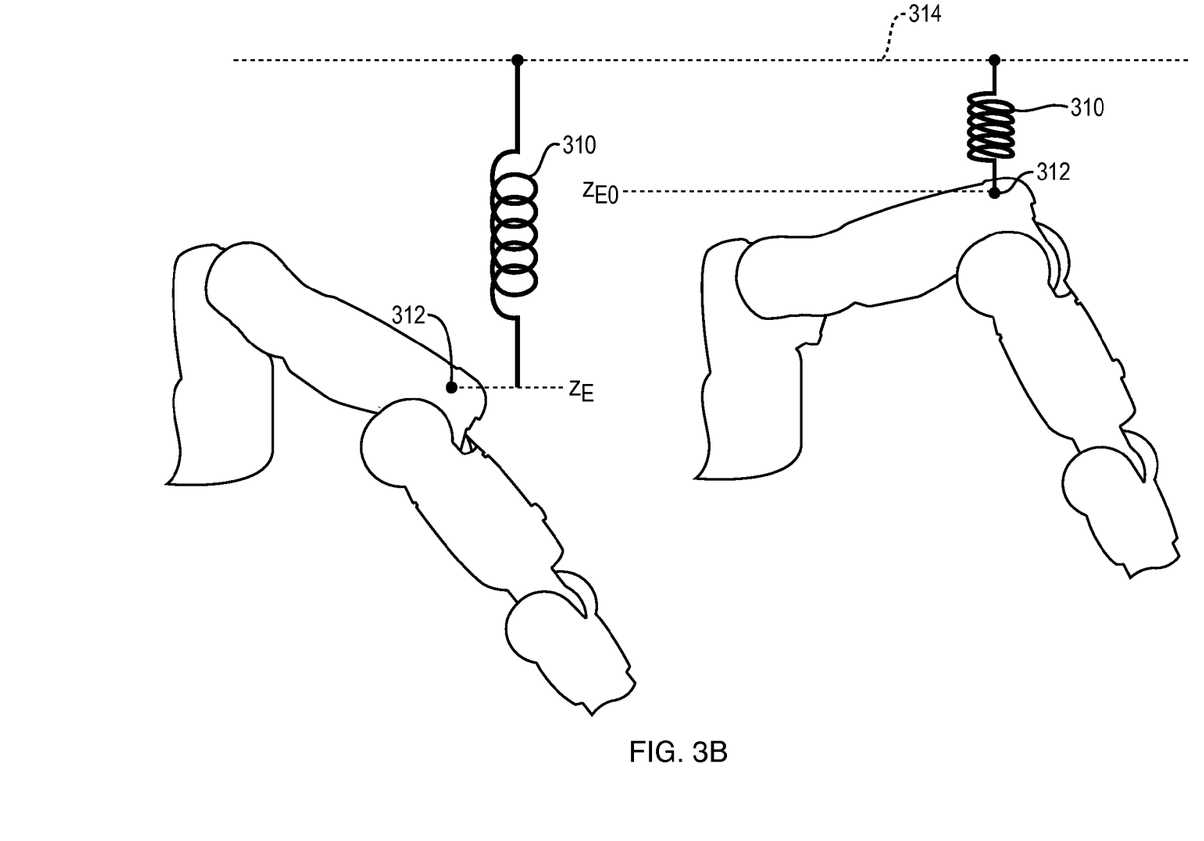
FIG. 3B is a schematic drawing illustrating a virtual spring applied between a point on a robot arm and a fixed spatial location in the extended state (left) and the relaxed state (right) in accordance with one embodiment for computing constraining forces or torques.

Cartesian constraints can be modeled with virtual springs in the constrained direction between the selected points on the robot arm and fixed coordinates that result, in the relaxed (or equilibrium) state of the spring, in the respective canonical positions. For example, as illustrated conceptually in FIG. 3B (showing a current posture (left) and a canonical posture (right) of a robot arm side-by-side), a virtual spring 310 in the z-direction may tie the elbow 312 of the robot, whose height is $z_E$ (left) to a fixed height 314 such that, when the spring is relaxed (right), the elbow 312 is at the canonical height $z_{E0}$. The restoring force $f_E$ associated with such a spring connected to the elbow is:

$$f_E = K(z_E - z_{E0})$$

This restoring force can be converted to joint torques using the Jacobian of the arm linkage, $$T_R = J^T f_E,$$

where $J^T$ is the transpose of the Jacobian for a sub-mechanism of the arm including only the upstream parts of the chain (i.e., the joints upstream of, or proximal to, the elbow, where torques can be applied to simulate the virtual spring), and $T_R$ and $f_E$ are vectors. These torque terms are then added to the gravity-compensating terms $G(\{\theta_i\}, \{m_k\}, \{l_k\}, \{d_k\})$, resulting in the following torques applied to the joints j:

$$T_j = G_j(\{\theta_i\}, \{m_k\}, \{l_k\}, \{d_k\}) + T_{Rj}.$$

To set the canonical position or posture in Cartesian space, the same methods as described above for setting canonical postures in joint space can be employed. For example, in certain embodiments, the canonical position in Cartesian space can be set, for a given point and direction, by pressing a switch, guiding the arm in the desired position (e.g., such that the elbow is located at the desired height), and then releasing the switch (to thereby set the canonical elbow height to the current height). Alternatively, the desired position may be entered numerically, e.g., via a traditional user interface.

As will be readily appreciated by persons of skill in the art, various aspects described above with respect to constraints in joint space can be straightforwardly applied to Cartesian constraints as well. For example, the above Cartesian constraints may be modified to include damping terms, or to model the spring as attached to a mass with static friction rather than a fixed point. Further, the stiffness of the spring (or the stiffnesses of multiple springs attached at multiple respective robot points) may be straightforwardly tuned to optimize the trade-off between sufficiently constraining the arm and keeping it easy to move by hand, and/or to minimize the forces at the endpoint. The internally applied forces may also be projected into, or computed in, the robot's null space to eliminate (or almost eliminate) internal forces at the endpoint. Furthermore, in some embodiments, joint-space and Cartesian constraints are used together to stabilize redundant robotic manipulators.

The effect of constraining redundant degrees of freedom in joint space or Cartesian space by means of virtual springs urging the manipulator toward a fixed canonical position, as described above, is generally to keep the links or joints of the arm that are responsible for the redundancy close to that canonical position—e.g., close to their starting positions when the switch is released—while the endpoint is moved around. This approach inherently provides the flexibility to set the canonical position however is convenient for the task at hand. Its drawback is that, once the arm is moved far from where it started, there can be significant forces on the endpoint that the operator has to overcome or, if forces are applied only in the robot's null space, the constraining forces can become vanishingly small (because the canonical posture is far away from the instantaneous null space).

Accordingly, in alternative embodiments, arm motion is constrained in a manner that reduces the constraining forces over long ranges of motion, at the cost of relying on the a-priori specification of an "ideal" arm posture defined throughout (i.e., as a function of the position within) the workspace and/or range of possible robot configurations. This ideal—or, in the terminology previously used, canonical—posture is generally determined based on heuristics about the preferability of one arm posture over another. For example, for the robot depicted in FIGS. 1A and 1B, it may be desirable to require that the elbow points backward and to the side when the end-effectors is at the front, points forward and to the side when the end-effector 112 is at the back, and points up when the arm is stretched out, with the end-effector 112 away from the robot body. In this case, the canonical posture is a function of the location of the endpoint relative to the robot. Of course, the canonical posture may, in general, depend on the location or orientation of any robot part (such as, to provide another example, the orientation of the robot's shoulders). Further, canonical arm posture may be a function of the robot's location and orientation in the workspace, or depend on the task the robot is currently executing and/or on conditions of its environment. To provide another example, if the robot is working in the pit of an automobile production line, installing pieces from below on the bottom of a car chassis, it may be desirable to keep the robot's elbow down rather than up so as to minimize the chance of collisions with the work surfaces above the robot. A dynamic canonical posture (i.e., a canonical posture defined as a (discrete or continuous) function of other variables, but fixed at any instant of time) is often specified in the robot's programming; however, it may also be based (at least partially) on user input provided physically, numerically, or otherwise. For example, a user may manually guide the robot into preferred postures for a finite number of positions in the workspace, tasks, etc., and the robot may thereafter select at any time one of these postures as the canonical posture, based on the circumstances.

Figure 4:
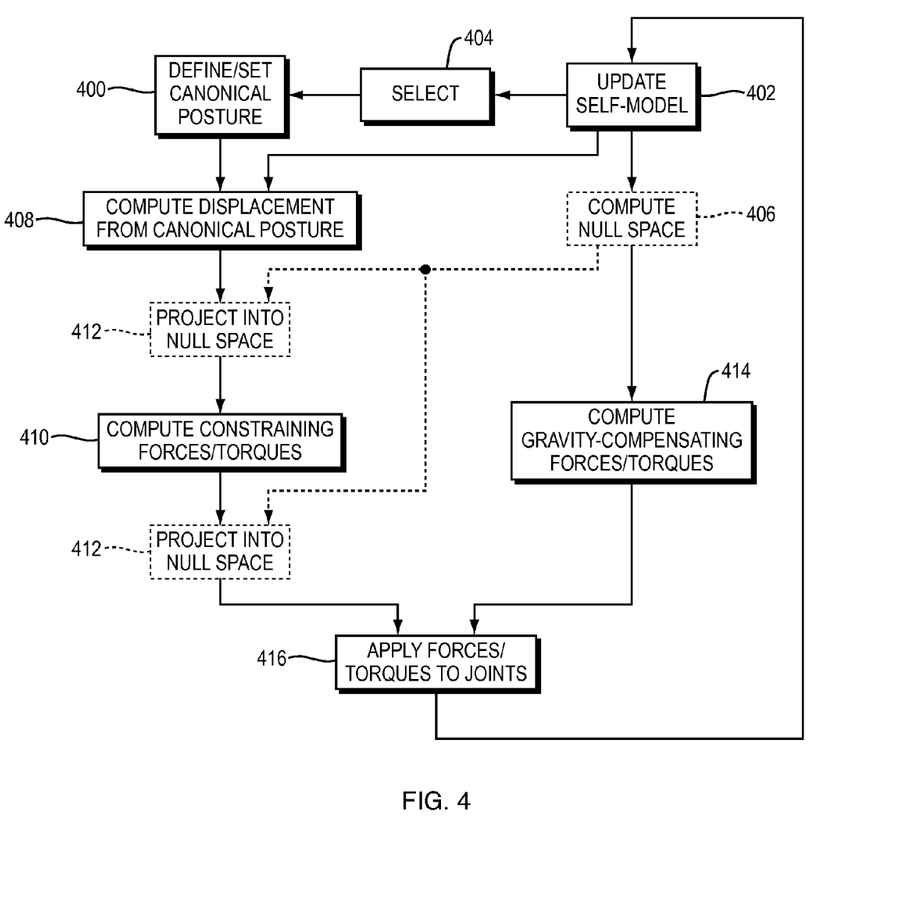
FIG. 4 is a flow chart illustrating methods for constraining redundant robotic manipulators in accordance with various embodiments.

FIG. 4 summarizes, in the form of a flow chart, various methods for constraining redundant robotic manipulators. Constraining the manipulator generally involves defining a canonical posture (step 400), either statically, or dynamically as a function of other variables (such as the position and/or orientation in the workspace, the position and/or orientation of one robot part relative to another, the robot's task, environmental conditions, etc.). The canonical posture may be set physically (e.g., by the user guiding the robot into the desired posture) and recorded, or it may be specified numerically (e.g., programmatically and/or via user input). The canonical posture may be a partial posture, i.e., it need not specify the posture of the arm completely, but may be limited to specifying positions associated with strategic joints or robot points that are to be constrained in their motion. Further, to determine (or estimate) the robot's current instantaneous posture, the robot's self-model is continuously or frequently updated (step 402). In embodiments in which the canonical posture is a function of certain aspects of the robot's current posture (e.g., whether the robot's end-effector is in the front or back), the updated self-model may also be used to update the selection of the canonical posture (step 404). Further, if the constraints are to be imposed in the robot's null space, the self-model may be used to compute the instantaneous null space (i.e., the possible movements of the manipulator that do not move the endpoint) (step 406).

From the current and canonical postures, the displacement(s) of the current (e.g., angular) positions from the canonical positions are calculated (step 408). Constraining forces and/or torques are then computed from these displacements (optionally in conjunction with other parameters, such as the rate of change of angular positions or other posture parameters) based on a computational model of the constrained behavior (e.g., a virtual-spring model as described above) (step 410). In some embodiments, the displacement(s) and/or the constraining forces or torques computed therefrom are projected into the null space (step 412). In addition to the forces and/or torques that constrain the robotic manipulator's redundancy, forces and/or torques that compensate for the gravitational forces at each joint are computed (step 414). The two sets of force/torques are then added to compute torques for all of the joints, which are then applied to the joints (step 416) to operate the robot in a gravity-compensated, yet constrained mode. This process is repeated as long as the robot is in its user-guided mode.

The computational functionality required for computing torques that compensate for gravity while weakly constraining the redundant degrees of freedom in accordance with any of the various embodiments described above can be provided by a one or more embedded programmable microprocessors, digital signal processors, field-programmable gate-arrays, application-specific integrated circuits, a suitably programmed general-purpose computer, or generally any suitable combination of hardware and/or software. Typically, the computational facility includes at least a processor and associated memory (which may store, e.g., a computational representation of the canonical posture and the robot's self-model) as well as one or more buses that facilitate communication therebetween and/or with the sensors and the robot controller. The computational facility may be embedded in the robot (e.g., in its body or manipulators), provided separately therefrom in communication with the robot via a wired or wireless connection (e.g., via Ethernet, Bluetooth, WLAN, the Internet, etc.); or distributed between multiple devices, which may be embedded and/or applied separately.

Figure 5:
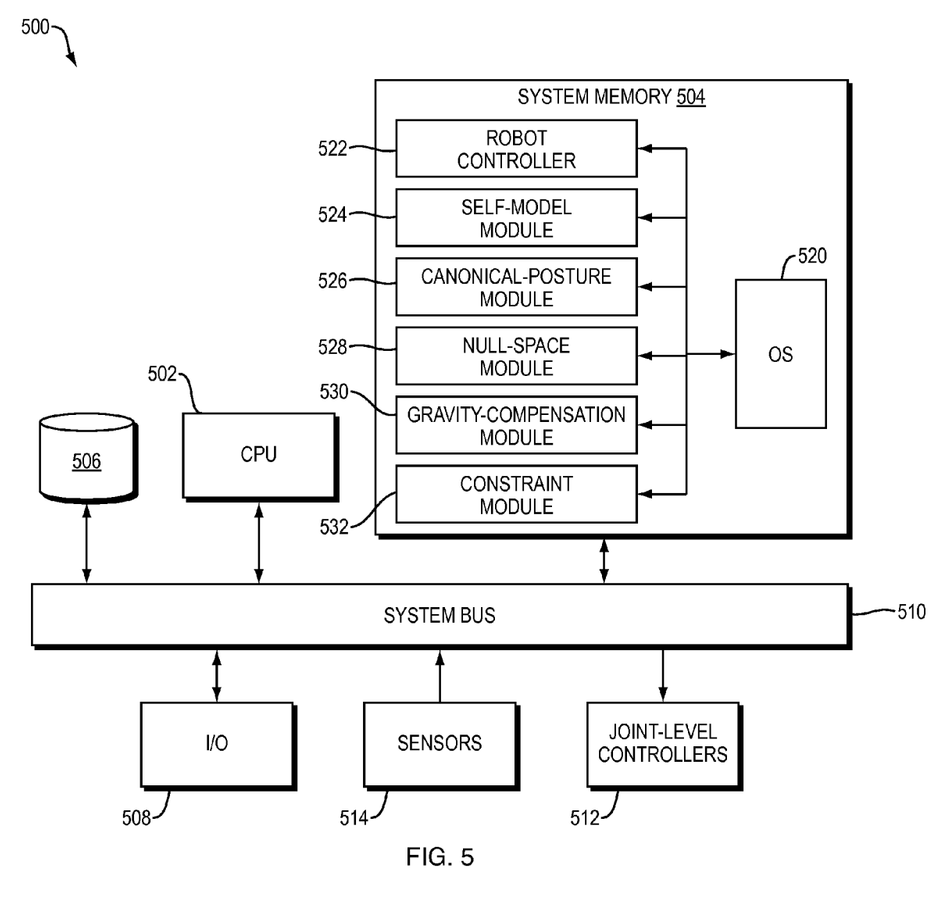
FIG. 5 is a block diagram schematically illustrating a computational facility for computing constraining forces or torques in accordance with various embodiments.

In one embodiment, illustrated in FIG. 5, a general-purpose computer 500 provides a central computational facility coordinating the motions of the robot, including computing the constraining forces applied to the joints. The computer 500 may include a processor (CPU) 502 and associated system memory 504 (e.g., random access memory (RAM)), one or more non-volatile storage devices 506 (e.g., one or more hard drives, CD-ROMs, DVDs, magnetic tapes, USB memory keys, or other conventional data storage media), a user interface 508 with input/output (I/O) devices (e.g., screen, keyboard, and mouse), and a system bus 510 that facilitates communication between these components. The system bus 510 also connects the computer with the joint-level controllers 512 and robot sensors 514 that serve to monitor the positions of and forces applied at the joints (e.g., the sensors in the series elastic actuators).

The system memory 504 stores processor-executable instructions organized into modules, including an operating system (OS) 520 that governs file access, memory allocation, and other low-level functionality, as well as one or more high-level applications for implementing the methods described herein. The high-level applications may include, e.g., a module implementing the robot controller 522 (which sends commands to the external joint-level controllers 512), a module 524 for maintaining the robot's self-model based on input from the sensors 514, a module 526 for recording or otherwise defining the canonical posture(s), a module 528 for determining the robot's current null space, a module 530 for computing the torque terms required to compensate for gravity, and a module 532 for modeling constraints on the redundant degrees of freedom, e.g., by means of virtual springs pulling the manipulator towards the canonical posture, and computing the additional torque terms implementing these constraints. The modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. Of course, the instructions implementing the various functions may be grouped and organized in many different ways; the depicted organization into a few discrete modules is exemplary only.

The terms and expressions employed herein are used as terms and expressions of description and not of limitation, and there is no intention, in the use of such terms and expressions, of excluding any equivalents of the features shown and described or portions thereof. In addition, having described a particular embodiment of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A robot comprising:
    a manipulator comprising a plurality of links connected in series by a plurality of joints, the manipulator having at least one redundant degree of freedom;
    controllers associated with the joints for applying torques to the manipulator via the joints; and
    a computational facility in communication with the controllers for computing torques to be applied to the joints in a mode compensating for gravity while reducing uncontrollable drifts of the manipulator resulting from the gravity compensation by constraining movements of the manipulator, the torques comprising a constraining torque urging a posture of the manipulator to a canonical posture,
    wherein an end-point of the manipulator is moved only when the torques are counteracted by an applied force.

2. The robot of claim 1, wherein the computational facility comprises memory storing a computational representation of the canonical posture.

3. The robot of claim 2, wherein the stored canonical posture varies dynamically as a function of at least one of a location or orientation of a part of the robotic manipulator relative to other robot parts, a robot location or orientation within or a condition associated with a robot workspace, or a currently executed robot task.

4. The robot of claim 1, further comprising sensors for measuring parameters of the posture of the manipulator.

5. The robot of claim 4, wherein the computational facility comprises a module for computing, based on the measured parameters, a displacement of the posture of the manipulator from the canonical posture.

6. The robot of claim 5, wherein the constraining torque comprises a restoring torque whose magnitude depends linearly on the displacement.

7. The robot of claim 1, further comprising a user-interface element allowing a user to set the canonical posture to a current posture of the manipulator.

8. The robot of claim 1, wherein the computational facility comprises a module for computing the constraining torque in a null space of the manipulator.

9. The robot of claim 1, wherein the computational facility comprises a module for setting a magnitude of the at least one constraining torque to minimize an internal force at an end-point of the manipulator.

10. The robot of claim 1, wherein the joints comprise series elastic actuators, the computational facility being configured to cause the controllers associated with the joints to drive the actuators with respective drive currents corresponding to the torques to be applied to the joints.

* * * * *